(12) United States Patent
Valerdi Rodriguez et al.

(10) Patent No.: US 8,615,247 B2
(45) Date of Patent: Dec. 24, 2013

(54) VOICE CALL RESOURCE REALLOCATION IN THE DOWNLINK DUAL CARRIER

(75) Inventors: David Segundo Valerdi Rodriguez, Madrid (ES); Miguel Angel Arranz Arauzo, Madrid (ES); Alberto Gomez Coloma, San Sebastian de los Reyes (ES)

(73) Assignee: Vodafone Group PLC, Newbury, Berkshire (GB)

( * ) Notice: Subject to any disclaimer, the term of this patent is extended or adjusted under 35 U.S.C. 154(b) by 392 days.

(21) Appl. No.: 12/826,934

(22) Filed: Jun. 30, 2010

(65) Prior Publication Data

US 2010/0331005 A1  Dec. 30, 2010

(30) Foreign Application Priority Data

Jun. 30, 2009 (ES) .................................. 200930378

(51) Int. Cl.
*H04W 72/00* (2009.01)
(52) U.S. Cl.
USPC .......................................... 455/450; 370/329
(58) Field of Classification Search
USPC .................... 455/450–453; 370/329, 330, 370/229–230.1, 280
See application file for complete search history.

(56) References Cited

U.S. PATENT DOCUMENTS

| | | | |
|---|---|---|---|
| 5,491,741 A * | 2/1996 | Farwell et al. ................. | 370/347 |
| 6,006,092 A * | 12/1999 | Ward ............................ | 455/438 |
| 6,418,317 B1 * | 7/2002 | Cuffaro et al. ................ | 455/450 |
| 2003/0035434 A1 * | 2/2003 | Le et al. ........................ | 370/443 |
| 2005/0070295 A1 | 3/2005 | Horanieh | |
| 2006/0092877 A1 * | 5/2006 | Niemela ........................ | 370/330 |
| 2006/0121946 A1 * | 6/2006 | Walton et al. ................. | 455/561 |
| 2006/0165122 A1 * | 7/2006 | Gupta et al. .................. | 370/468 |
| 2007/0104134 A1 * | 5/2007 | Pecen et al. ................... | 370/329 |
| 2009/0168797 A1 * | 7/2009 | Danielson et al. ............ | 370/458 |
| 2009/0245224 A1 * | 10/2009 | Iyer et al. ...................... | 370/345 |
| 2011/0077017 A1 * | 3/2011 | Yu et al. ........................ | 455/452.1 |

FOREIGN PATENT DOCUMENTS

| | | |
|---|---|---|
| WO | 2007/072341 | 6/2007 |
| WO | 2007/116224 | 10/2007 |

OTHER PUBLICATIONS

Extended European Search Report issued on Oct. 27, 2010 in connection with corresponding European Patent Application No. 10167928.0.

* cited by examiner

*Primary Examiner* — Lester Kincaid
*Assistant Examiner* — Daniel Lai
(74) *Attorney, Agent, or Firm* — Workman Nydegger

(57) ABSTRACT

A method and system for voice call resource reallocation in a downlink dual carrier. The method includes: monitoring status of timeslots dedicated to voice calls in different transceivers (TRXs) of a Base Transceiver Station (BTS) and obtaining from each TRX a respective priority of each timeslot of the TRX dedicated to voice calls; obtaining a priority for voice calls of each empty timeslot in the different TRXs; and reallocating at least one timeslot already dedicated to voice calls to at least one empty timeslot when the priority for voice calls of the at least one empty timeslot is higher than the priority for voice calls of at least one timeslot already dedicated to voice calls.

19 Claims, 2 Drawing Sheets

VOICE CALL RESOURCE REALLOCATION IN THE DOWNLINK DUAL CARRIER

CROSS-REFERENCES AND RELATED APPLICATIONS

This application claims the benefit of the Spanish Patent Application No. ES P200930378, filed on Jun. 30, 2009, which is hereby incorporated by reference in its entirety.

FIELD

Embodiments of the present invention are directed to the field of mobile telecommunications, and more specifically to allocating timeslots dedicated to voice calls for optimizing the downlink dual carrier.

BACKGROUND

Scarce spectrum and growing customer demand for faster data throughput are challenges perceived by almost all mobile operators. The existing approaches squeeze the spectrum by enhanced spectrum efficiency algorithms like higher order modulation, but it implies big impact on existing network and handsets, so that in most cases new and expensive hardware has to be introduced.

On the other hand there is already a GSM feature standardised in 3GPP which addresses higher throughput needs without hardware impact at all in the network: downlink dual carrier (DLDC). With DLDC the mobile station is able to receive data over 2 frequencies simultaneously instead of only 1, so that the data rate is doubled.

Dual carrier allows to double the number of timeslots per user and hence the throughput. A description of dual carrier can be found including the 3GPP specification in 3GPP 45.912 Chapter 7.

In GSM data connections, number of timeslots allocated per user is defined in the terminal class, which defines the maximum number of timeslots in downlink (DL), uplink (UL) and DL&UL. Although it is possible to have non adjacent timeslots for data it is hardly limited by the terminal capability (i.e., if a terminal supports 4 timeslots in downlink, it will be able to have at the same time timeslot 7 and 4 as timeslot separation is 4, but not timeslots 7 and 3).

However, in order to be able to use the DLDC capability, several timeslots in different TRXs (transceivers) need to be empty at the same time (i.e. if a cell has 4 TRX there must be at least two TRXs empty within the range of timeslots supported by the mobile). This solution enables to allocate voice resources so empty resources can be used for DLDC.

In order to comply with both the scarce spectrum in one band and the customer demand for faster data throughput, the DLDC feature with a simple but ingenious addition is taken into account. DLDC will use timeslots in different TRXs that are empty at the same time. In order to have that situation as many times as possible the algorithm will allocate voice traffic in contiguous timeslots.

BSC (Base Station Controller) will monitor every x seconds the status of the different timeslots used for voice calls. Voice calls will be located either on the low or high timeslots, and data calls will be located in the other side, e.g. Timeslot 0 has highest priority for voice calls but lowest for EDGE evolution calls. BSC will check if there are empty timeslots with higher priority for voice calls than the ones being used. If that is the case, those voice calls will be moved to the empty timeslots. This will free timeslots in different TRXs that can be used together with DLDC feature.

It is well-known that abbreviations and acronyms are frequently used in the mobile telephony field. Below is a glossary of acronyms/terms used throughout the present specification:

| | |
|---|---|
| 3GPP | The 3rd Generation Partnership Project |
| BCCH | Broadcast Control Channel |
| BSC | Base Station Controller |
| BTS | Base Transceiver Station |
| DL | Downlink |
| DLDC | Downlink Dual Carrier |
| GSM | Global System for Mobile Communications |
| UP | Uplink |
| TRX | Transceiver |

SUMMARY OF EXAMPLE EMBODIMENTS

Embodiments of the invention relate to methods for voice call resource reallocation in the downlink dual carrier.

For example, a disclosed method comprises:
monitoring the status of the timeslots dedicated to voice calls in the different TRXs of a BTS, obtaining its respective priority for voice calls;
obtaining the priority for voice calls of each empty timeslot in the different TRXs of the BTS;
checking if there is at least one empty timeslot with higher priority for voice calls than the priority of at least one timeslot already dedicated to voice calls, and if that is the case:
for each empty timeslot with higher priority for voice calls than the priority of at least one timeslot already dedicated to voice calls, reallocating one of said timeslot already dedicated to voice calls to said empty timeslot.

The priority for voice calls of each empty timeslot can be obtained as a whole, considering all the TRXs of the BTS.

The priority for voice calls of each timeslot dedicated to voice calls can be obtained as a whole, considering all the TRXs of the BTS.

The priority for voice calls is preferably assigned as follows:
timeslots in the TRXs that are preferred for voice calls have higher priority for voice calls than timeslots in the TRXs that are preferred for data calls;
in any TRX timeslots that are further away from the timeslots preferred for data have higher priority for voice calls.

In one embodiment, in TRXs of the same type, the timeslot belonging to a first TRX with more empty timeslots than a second TRX have higher priority for voice calls than the timeslot at the same position belonging to the second TRX.

In another embodiment, the lower the number of the timeslot in a TRX the higher the priority for voice calls. In another embodiment, the higher the number of the timeslot in a TRX the higher the priority for voice calls.

The step of monitoring the status and the subsequent steps of the voice call resource reallocation method can be repeated periodically.

An example system for voice call resource reallocation in the downlink dual carrier comprises a BSC configured for:
monitoring the status of the timeslots dedicated to voice calls in the different TRXs of a BTS, obtaining its respective priority for voice calls;
obtaining the priority for voice calls of each empty timeslot in the different TRXs of the BTS;

checking if there is at least one empty timeslot with higher priority for voice calls than the priority of at least one timeslot already dedicated to voice calls, and if that is the case:

for each empty timeslot with higher priority for voice calls than the priority of at least one timeslot already dedicated to voice calls, reallocating one of said timeslot already dedicated to voice calls to said empty timeslot.

The priority for voice calls of each empty timeslot can be obtained as a whole, considering all the TRXs of the BTS.

The BSC can be configured to obtain the priority for voice calls of each timeslot dedicated to voice calls as a whole, considering all the TRXs of the BTS.

The BSC can be also configured to assign the priority for voice calls as follows:

timeslots in the TRXs that are preferred for voice calls have higher priority for voice calls than timeslots in the TRXs that are preferred for data calls;

in any TRX timeslots that are further away from the timeslots preferred for data have higher priority for voice call.

The BSC can be configured to assign higher priority for voice calls to a timeslot belonging to a first TRX than to a timeslot at the same position belonging to a second TRX, the first TRX having more empty timeslots than the second TRX and being said first and second TRXs of the same type.

In a disclosed embodiment the BSC is configured to carry out periodically the monitoring of the status of the timeslots dedicated to voice calls for repeating, if necessary, the voice call resource reallocation.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION OF EXAMPLE EMBODIMENTS

A new algorithm is defined in order to allocate voice calls in a way that it is more efficient for data connections. This new algorithm will be used in admission control (i.e. whenever a voice call is allocated a new channel) and also on a periodic basis in order to reduce problems for oncoming data calls.

In wireless networks, voice is the highest priority service so in most cases voice call will get the resources and data calls will have the resources that are left. Whenever there is a conflict between voice and data, usually voice has the priority.

This algorithm will define a number of channels which are more suitable for data calls, although they do not have to be necessarily reserved for data calls. In order to define these channels there will be some parameters defined by the operator:

A parameter to configure which is the optimum number of timeslots to be used in each carrier for data sessions, NumTSCarrier.

A parameter to define which 2 carriers will be used for data, although this will be already part of normal dual carrier algorithms.

This algorithm is focused on enhancing data performance by modifying the voice call resource allocation. Data calls allocation is not under the scope of the present invention.

Timeslots Priority Order

When a new voice user is going to be allocated a new channel in one cell, the algorithm shall take into consideration that the new voice channel should be allocated as close as possible to the other voice channels in order to free consecutive timeslots for data users. Available timeslots will be ordered based on an allocation priority as follows:

1. Timeslots in TRXs (transceivers in charge of transmitting) that are not preferred for data.
2. Timeslots in TRXs that are preferred for data.
3. In any TRX, the timeslots that are farther away from the timeslots preferred for data will have higher priority.
4. For timeslots located at the same position belonging to TRXs in same conditions, the timeslot belonging to TRX with more empty timeslots will have higher priority.

Figure 1:
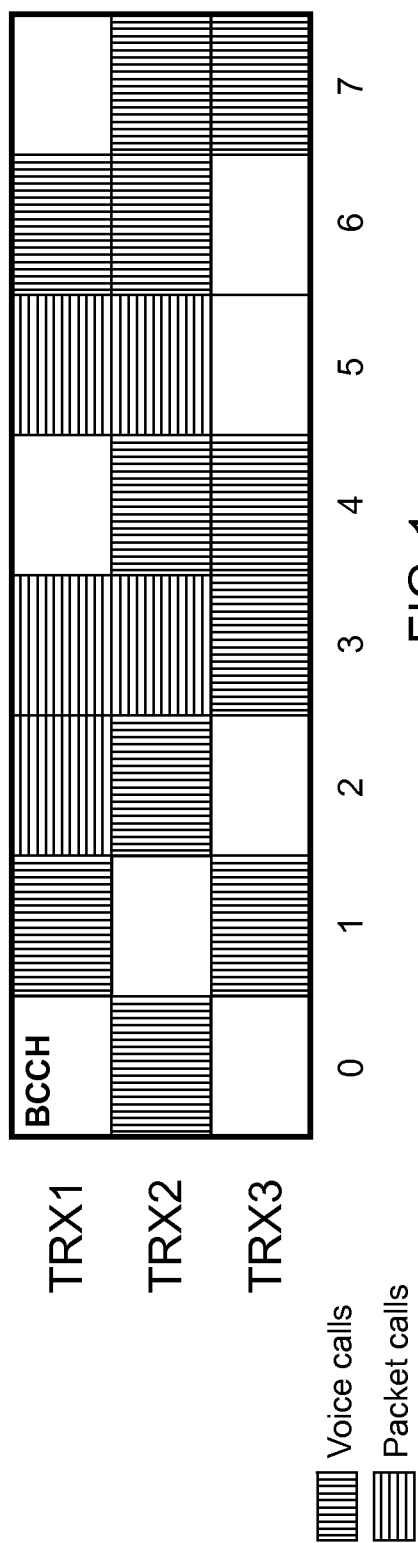
FIG. 1 shows an example of an initial situation in the allocation of timeslots (voice timeslots/data timeslots) in the downlink dual carrier.

An example of an initial situation in the downlink dual carrier is shown in FIG. 1:

TRXs 1 and 2 are the ones selected for data. TRX 3 is selected only for voice.

4 timeslots are selected in each carrier as the optimum number of timeslots per carrier for data.

Position to start from is timeslot 7, so timeslots to be considered for data are Timeslots 4-7 in TRXs 1 and 2.

TRX 1 has one BCCH channel.

Figure 2:
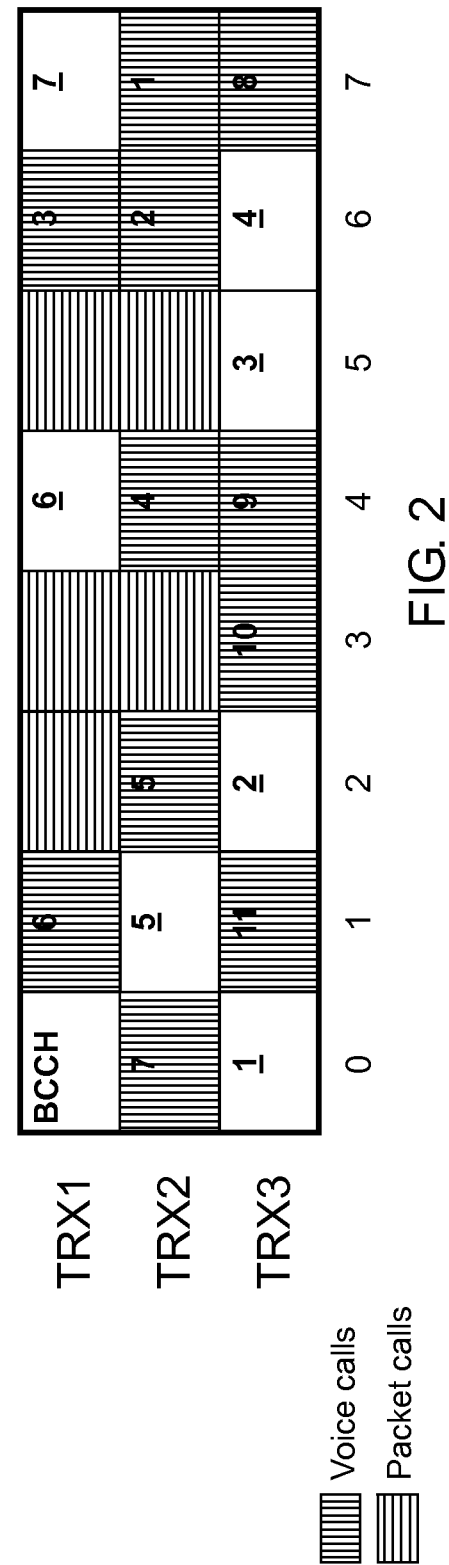
FIG. 2 shows the order timeslot diagram, according to the invention, where the different priority orders are allocated (for both the voice call timeslots to be allocated and the free timeslots where the voice call timeslots can be allocated), for the example shown in FIG. 1. In this case TRX3 is preferred for voice calls and TRX1 and 2 for data calls, being lower timeslots preferred for voice.

Timeslots priority allocation in this example (according to the timeslots priority order) is represented in FIG. 2 by the number inside the timeslots, the lower the number the higher the priority for dedicating the timeslot for voice calls. The timeslots with higher packet priority are the higher ones (7, 6, 5, . . . , 1, 0) of TRX1 and TRX2. Timeslots with higher voice priority are lower ones (0, 1, 2, . . . , 7).

According to the method, the goal is to move timeslots dedicated to voice calls that are in the packet area (higher timeslots) to the voice call area (lower timeslots). The order of the voice call timeslots to be allocated is indicated by an ordinal number (the lower the number, the higher the order to be allocated). Free timeslots priority order (the priority order for the free timeslots where the voice call timeslots are to be allocated) is indicated by an underlined ordinal number (the lower the number, the higher the priority of the free timeslot to be used for the allocation).

Figure 3:
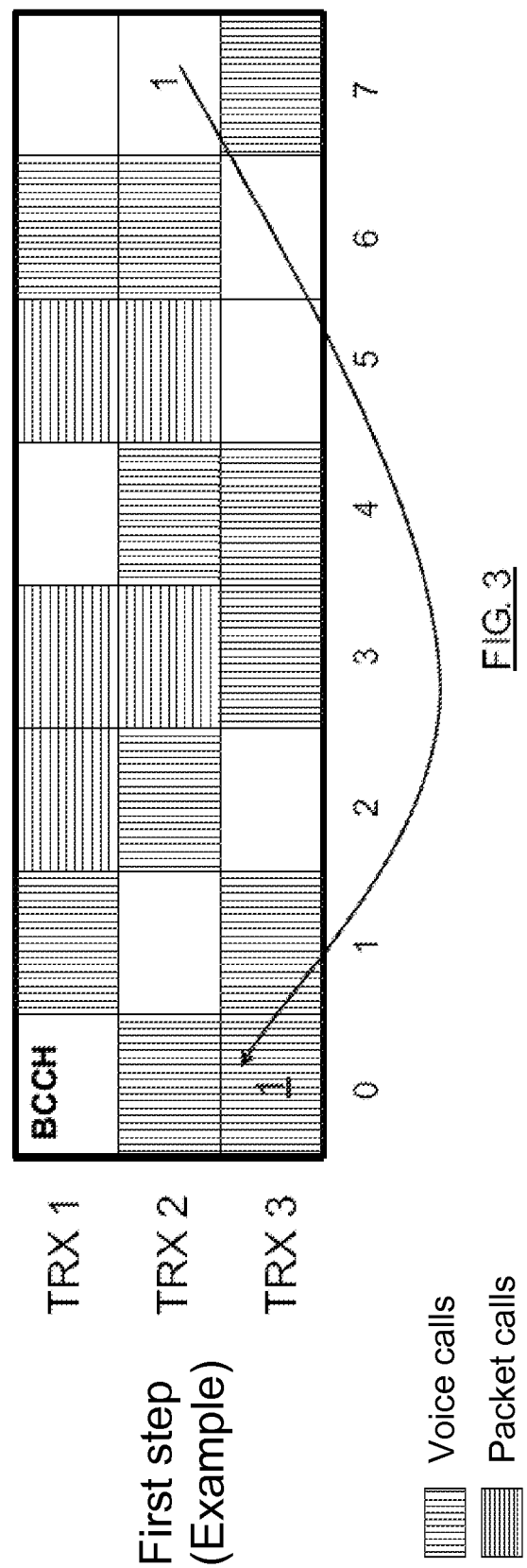
FIG. 3 shows, for the example of FIG. 1, the first step of the voice timeslots reallocation according to the method of the present invention, in which a first voice call timeslot has been reallocated according to the priority indicated in FIG. 2.

The first step of the voice timeslots reallocation process is indicated in FIG. 3, which shows a first voice call timeslot reallocated according to the priority indicated in FIG. 2. The first voice call timeslot to be allocated (order 1) is reallocated, shown with a curved arrow, to the free timeslot with first higher priority (priority order 1). In a subsequent step, not shown in FIG. 3, a second voice call timeslot (order 2) should be reallocated to the free timeslot with second higher priority (priority order 2), and the process will continue with further steps till either all the voice call timeslots have been reallocated (in case there are enough free timeslots) or all the free timeslots have been occupied by the reallocation of the voice call timeslots.

In every step of the reallocation process the reallocation will be carried out only if there is an improvement in the allocation process (that is, if the free timeslot would have a higher priority order than the voice call timeslot supposing it were free); if that is not the case the reallocation process ends. In the example shown in FIGS. 1-3, the reallocation process would end in the fifth step. The first five voice call timeslots would be reallocated since there is an improvement in the priority allocation; however, the sixth voice call timeslot (indicated by ordinal number 6, not underlined, in FIG. 2) would not be reallocated, since it would have a higher priority order, supposing it were free, than the sixth free timeslot (indicated by ordinal underlined number 6 in FIG. 2), and the reallocation of this sixth voice call timeslot would result in worsening the allocation of the voice call timeslot for the purpose mentioned before.

Congestion Control

As a protection (congestion control) there will be an algorithm that will repack the voice communications in order to free space for upcoming data calls.

There is a parameter that will control the periodicity of the algorithm in seconds (repacking period).

Algorithm

Three parameters can be defined in the algorithm:

Limit_Free_Data_Timeslots: the minimum number of data possible timeslots not used by voice calls. They can either be unused or used by data connection.

Limit_Free_Voice_Timeslots: the minimum number of free timeslots that can be used for voice but not in the data defined timeslots.

Margin: a margin defined to stop the reallocation procedure in order to avoid the algorithm to be repeated continuously, which would probably be the case if parameter Limit_Free_Data_Timeslots is used in the algorithm.

The pseudocode of the algorithm can be the following:

```
If (Free Data Timeslots < Limit_Free_Data_Timeslots) and
(Free_Voice_Timeslots > Limit_Free_Voice_Timeslots) then
    Order (Timeslots)
    i=Start of timeslot list
    Do until (Free Data Timeslots = Limit Free Data Timeslots + Margin)
        Reallocate Timeslot(i)
        i =i+1
    Next
End if
```

Free Data Timeslots is the number of current free data timeslots and Free_Voice_Timeslots is the number of current free voice timeslots.

The function Order (Timeslots) will order the timeslots according to the timeslots priority order, as shown in FIG. 2, but in this case the other way around with lower priority for data being the first ones. Of course only the timeslots occupied by voice call will be considered.

The function Reallocate Timeslot (i) will reallocate voice call in timeslot i to another timeslot following the timeslots priority order, as shown in FIG. 3 for the first step of the reallocation. The idea is that the voice call with lower priority will be reallocated in another timeslot with higher priority.

The invention claimed is:

1. A method for voice call resource reallocation in a downlink dual carrier of a Base Transceiver Station (BTS), the BTS having a plurality of transceivers (TRXs) that each have a plurality of timeslots, each TRX being associated with a preference for voice or a preference for data, each timeslot of each TRX being empty or presently dedicated to voice calls or presently dedicated to data calls, the method comprising:
   determining a priority for voice calls for each of the timeslots presently dedicated to voice calls based on a relocation priority of each timeslot presently dedicated to voice calls, the relocation priority of each timeslot presently dedicated to voice calls being based on:
      the preference of the TRX in which the timeslot presently dedicated to voice calls is positioned; and
      the position of the timeslot presently dedicated to voice calls within the TRX; and
   determining a priority for voice calls for each of the empty timeslots based on an allocation priority for voice calls of each presently free timeslot, the allocation priority for voice calls of each presently free timeslot being based on:
      the preference of the TRX in which the free timeslot is positioned; and
      the position of the free timeslot within the TRX; and
   reallocating one of the timeslots presently dedicated to voice calls to one of the empty timeslots when the priority for voice calls of the empty timeslot is higher than the priority for voice calls of the timeslot presently dedicated to voice calls, the reallocation being based on the priority order of the presently free timeslots and the priority order of the timeslots presently dedicated to voice calls.

2. The method according to claim 1, wherein the priority for voice calls of each empty timeslot is obtained as a whole, considering all the TRXs of the BTS.

3. The method according to claim 2, wherein each TRX is preferred for voice calls or preferred for data calls, and wherein, for each TRX, each timeslot is preferred for voice calls or preferred for data calls with respect to the other timeslots in the TRX, and wherein the priority for voice calls for each of the timeslots presently dedicated to voice calls and for each of the empty timeslots is assigned as follows:
   timeslots of the TRXs preferred for voice calls have higher priority for voice calls than timeslots of the TRXs preferred for data calls; and
   for each TRX, timeslots that are further away from the timeslots preferred for data calls have higher priority for voice calls.

4. The method according to claim 3, wherein in first and second TRXs having the same preference, a timeslot at a position of the first TRX has a higher priority for voice calls than a timeslot at the same position of the second TRX if the first TRX has more empty timeslots than the second TRX.

5. The method according to claim 1, wherein the priority for voice calls of each timeslot presently dedicated to voice calls is obtained as a whole, considering all the TRXs of the BTS.

6. The method according to claim 1, wherein the lower the number of the timeslot in a TRX the higher the priority for voice calls.

7. The method according to claim 1, wherein the higher the number of the timeslot in a TRX the higher the priority for voice calls.

8. The method according to claim 1, wherein the steps of determining the priority for voice calls and the step of reallocating are repeated periodically.

9. A system for voice call resource reallocation in a downlink dual carrier of a Base Transceiver Station (BTS), the BTS having a plurality of transceivers (TRXs) that each have a plurality of timeslots, each TRX being associated with a preference for voice or a preference for data, each timeslot of each TRX being empty or presently dedicated to voice calls or presently dedicated to data calls, the system comprising:

A Base Station Controller (BSC) configured to:
determine a priority for voice calls for each timeslot presently dedicated to voice calls based on a relocation priority of each timeslot presently dedicated to voice calls, the relocation priority of each timeslot presently dedicated to voice calls being based on:
the preference of the TRX in which the timeslot presently dedicated to voice calls is positioned; and
the position of the timeslot presently dedicated to voice calls within the TRX; and
determine a priority for voice calls for each empty timeslot in the plurality of TRXs based on an allocation priority for voice calls of each presently free timeslot, the allocation priority for voice calls of each presently free timeslot being based on:
the preference of the TRX in which the free timeslot is positioned;
the position of the free timeslot within the TRX; and
reallocate at least one timeslot presently dedicated to voice calls to at least one empty timeslot when the priority for voice calls of the at least one empty timeslot is higher than the priority for voice calls of the at least one timeslot presently dedicated to voice calls, the reallocation being based on the priority order of the presently free timeslots and the priority order of the timeslots presently dedicated to voice calls.

10. The system according to claim 9, wherein the priority for voice calls of each empty timeslot is obtained as a whole, considering all the TRXs of the BTS.

11. The system according to claim 10, wherein each TRX is preferred for voice calls or preferred for data calls, and wherein, for each TRX, each timeslot is preferred for voice calls or preferred for data calls with respect to the other timeslots in the TRX, wherein the BSC is configured to assign the priority for voice calls as follows:
Timeslots of the TRXs preferred for voice calls have higher priority for voice calls than timeslots of the TRXs preferred for data calls; and
for each TRX, timeslots that are further away from the timeslots preferred for data calls have higher priority for voice calls.

12. The system according to claim 11, wherein the BSC is configured to assign a higher priority for voice calls to a timeslot at a position of a first TRX than to a timeslot at the same position of a second TRX, if the first TRX has more empty timeslots than the second TRX and the first and second TRXs have the same preference.

13. The system according to claim 9, wherein the BSC is configured to obtain the priority for voice calls of each timeslot dedicated to voice calls as a whole, considering all the TRXs of the BTS.

14. The system according to claim 9, wherein the BSC is configured to periodically perform the determining of the priorities for voice calls for each timeslot presently dedicated to voice calls and for each empty timeslot and the reallocation of timeslots.

15. The system according to claim 9, further comprising, for each empty timeslot having a higher priority for voice calls than at least one timeslot presently dedicated to voice calls, reallocating one of the at least one timeslot presently dedicated to voice calls to the empty timeslot.

16. A method for voice call resource reallocation in a Base Transceiver Station (BTS), the BTS having a plurality of timeslots, the timeslots being positioned in a plurality of transceivers (TRXs), each TRX having a preference for voice or a preference for data, each timeslot being presently dedicated to voice calls or presently dedicated to data calls or presently free, the method comprising:
determining a priority order for the presently free timeslots based on an allocation priority for voice calls of each presently free timeslot, the allocation priority for voice calls of each presently free timeslot being based on:
the preference of the TRX in which the free timeslot is positioned; and
the position within the TRX of the free timeslot; and
determining a priority order for the timeslots presently dedicated to voice calls based on a relocation priority of each timeslot presently dedicated to voice calls, the relocation priority of each timeslot presently dedicated to voice calls being based on:
the preference of the TRX in which the timeslot presently dedicated to voice calls is positioned; and
the position within the TRX of the timeslot presently dedicated to voice calls; and
reallocating one or more of the timeslots presently dedicated to voice calls to one or more of the presently free timeslots when the one or more presently free timeslots are in more preferred positions for voice calls than the one or more timeslots presently dedicated to voice calls, the reallocation being based on the priority order of the presently free timeslots and the priority order of the timeslots presently dedicated to voice calls.

17. The method according to claim 16, wherein the step of reallocating one or more of the timeslots presently dedicated to voice calls to one or more of the presently free timeslots comprises reallocating the highest priority timeslot presently dedicated to voice calls to the highest priority presently empty timeslot.

18. The method according to claim 16, wherein the step of reallocating one or more of the timeslots presently dedicated to voice calls to one or more of the presently free timeslots comprises:
starting with the highest ordered timeslot presently dedicated to voice calls and continuing through the order, reallocating the timeslot presently dedicated to voice calls to a presently free timeslot if the presently free timeslot is in a more preferred position for voice calls than the timeslot presently dedicated to voice calls.

19. The method according to claim 16, wherein a portion of the timeslots positioned within each TRX are preferred for data calls, and the allocation priority for voice calls is determined as follows:
presently free timeslots in the TRXs preferred for voice have higher allocation priority for voice calls than presently free timeslots in the TRXs preferred for data; and
for each TRX, presently empty timeslots that are positioned further away from the portion of the timeslots preferred for data have higher priority for voice calls.

* * * * *